United States Patent [19]

Kishon

[11] Patent Number: 5,605,473
[45] Date of Patent: Feb. 25, 1997

[54] VGA LOOPBACK CABLE PLUG

[75] Inventor: Jakob Kishon, San Ramon, Calif.

[73] Assignee: Capetronic Computer USA (HK) Inc., Campbell, Calif.

[21] Appl. No.: 523,769

[22] Filed: Sep. 5, 1995

[51] Int. Cl.$^6$ ................................................. H01R 11/00
[52] U.S. Cl. ........................................ 439/502; 361/686
[58] Field of Search .................................... 439/502, 638; 361/686, 682, 760, 776; 364/708.1

[56] References Cited

U.S. PATENT DOCUMENTS

| | | | |
|---|---|---|---|
| 5,097,388 | 3/1992 | Buist et al. | 364/708.1 |
| 5,257,163 | 10/1993 | Buist et al. | 361/682 |
| 5,294,994 | 3/1994 | Robinson et al. | 361/682 |
| 5,384,686 | 1/1995 | Mesfin et al. | 361/686 |

*Primary Examiner*—Neil Abrams
*Assistant Examiner*—Brian J. Biggi
*Attorney, Agent, or Firm*—Hopgood, Calimafde, Kalil & Judlowe

[57] ABSTRACT

A cable connector, particularly for use in a PC that includes a monitor and a motherboard in a single unit, has a decorative outer cover or shell and a plug at its inner end adapted to be connected to a video socket on the motherboard. Wires in the interior of the connector are connected to the plug and are turned through an angle of 180° to make connection with one end of a cable, the other end of which terminates in a plug for connection to the internal video monitor. The cable is able to pass directly into the chassis and under the motherboard for connection to the monitor such that only the decorative connector outer cover is visible at the external portion of the PC.

4 Claims, 2 Drawing Sheets

VGA LOOPBACK CABLE PLUG

TECHNICAL FIELD

The present invention relates generally to cable connectors, and more particularly to a cable connector that achieves connection between the video output terminal of a PC motherboard and a video monitor.

BACKGROUND OF THE INVENTION

In a conventional PC arrangement, the video monitor is a separate external unit to the PC, which typically contains the PC motherboard on which are mounted the microprocessor and associated memory, BIOS and control circuits. The external video monitor unit is typically connected to the PC motherboard by means of a cable which is connected at one of its ends, to the video socket on the motherboard; the other end of the cable extends external from the PC and is plugged into the video input of the monitor.

In recent years, it has become increasingly common to incorporate the PC and video monitor into a single unit. In order to reduce their manufacturing costs, manufacturers of these so-called all-in-one PC units still employ the standard PC motherboards that are used in PCs in which the monitor is located on a separate chassis from the motherboard. This standard motherboard includes an edge video socket, such as a 15-pin high density shell connector, that is used with a VGA monitor system. The standard motherboards are configured to couple the video signal from the motherboard video socket to an external monitor, not to a monitor mounted on a common chassis with the motherboard.

When the standard motherboard is used in a unit in which the video monitor is on the same chassis as the PC motherboard, the video socket on the motherboard extends outward beyond the chassis. Means must also be provided to couple the video signal via a coaxial cable from the motherboard video socket back into the chassis to be coupled to the internal monitor. Employing such a standard video cable arrangement, however, creates an unsightly connection to the motherboard video socket and an unwieldy coupling of the coaxial cable from the motherboard video socket to the internal monitor.

It is thus an object of the present invention to provide an improved video cable connector for use in a PC having an internal video monitor mounted on a common chassis with the PC motherboard.

It is a further object of the present invention to provide a cable for use in a PC in which connection between the motherboard and an internal video monitor is achieved in a neater and more compact manner.

It is another object of the present invention to provide a video cable connector of the type described, which facilitates the coupling of the video signal from the motherboard to an internal monitor and which provides a more decorative appearance of the video connector at the rear of the PC unit.

SUMMARY OF THE INVENTION

In accordance with the foregoing, the cable connector of the present invention includes an external decorative cover at its outer end, and a connector plug at its inner end adapted to be plugged into the video socket at the edge of a motherboard. Conductors within the connector are connected at one of their ends to connectors in the plug and are looped or turned through an angle of 180° to allow their other ends to be connected to one end of a video signal cable. The cable extends from the connector under the motherboard and into the PC chassis for connection at its other end to an internal video monitor mounted on a common chassis with the motherboard.

BRIEF DESCRIPTION OF THE DRAWINGS

To the accomplishment of the above and such further objects as may hereinafter appear, the present invention relates to an improved cable connector for use in a single unit PC, substantially as defined in the appended claims as considered along with the following detailed specification and accompanying drawings in which:

Referring now to the drawings, FIG. 1 illustrates a cable connecter according to a preferred embodiment of the invention, which is generally designated 10. Cable 10 includes a finished, decorative connector end cover or shell 12 at one end. Cover 12, which is preferably made of a molded plastic, is secured along its inner end to a metal cover plate 14. Plate 14 includes a central shroud 16 which surrounds, as shown in FIG. 4, a conventional VGA 15-pin high-density-D plug 18. Plug 18 is adapted to be coupled to a video socket 20 mounted on one edge of a standard PC motherboard 22.

Figure 1:
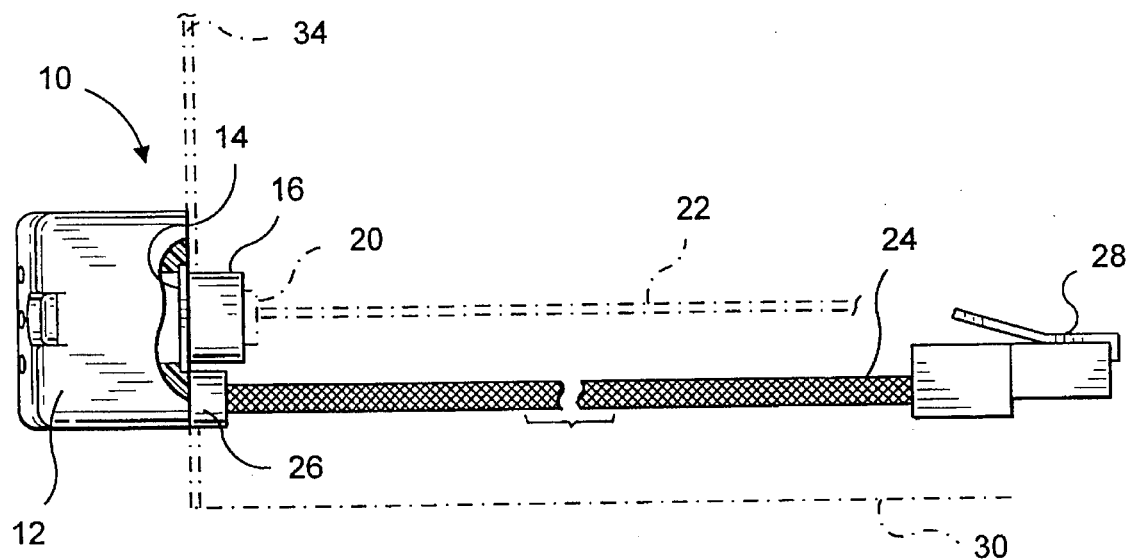
FIG. 1 is a side elevation, partly broken away, of a cable connector in accordance with an embodiment of the present invention shown in its intended application coupled to a video socket of a PC motherboard.
Figure 2:
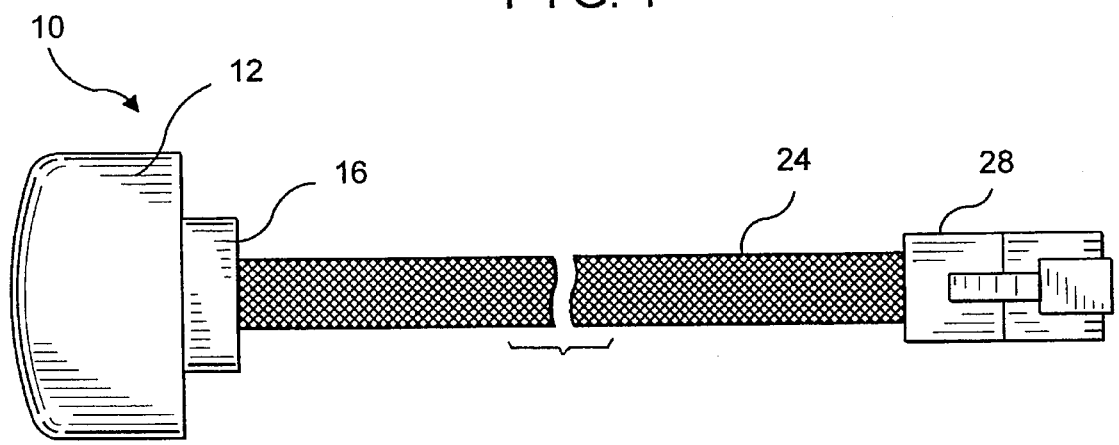
FIG. 2 is a top elevation of the cable connector of FIG. 1.
Figure 3:
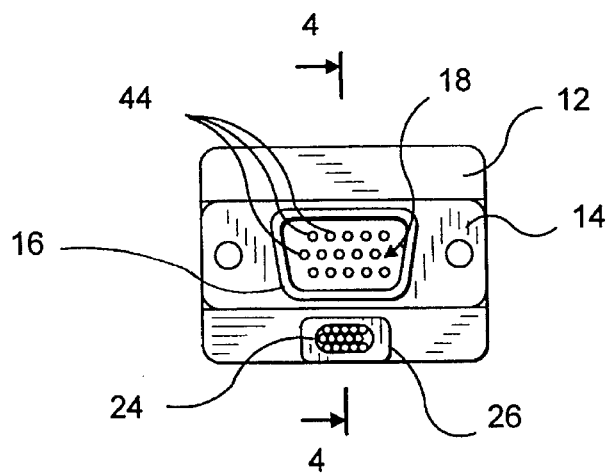
FIG. 3 is a front elevation of the video socket plug of the cable connector of FIG. 1.

A coaxial shielded flat video signal cable 24 is electrically coupled to plug 18 and extends outwardly from a rectangular projection 26 integral with cover 12 and located at the lower end of cover 12. Cable 24 terminates at its outer end in a standard RJ-45 plug 28 for connection to a standard VGA monitor (not shown). The monitor and PC motherboard 22 are combined and mounted in a common, single chassis, generally designated 30.

Figure 5:
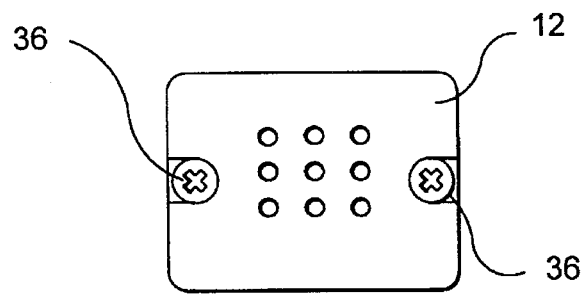
FIG. 5 is an end elevation of the cable connector end plug.

In accordance with the present invention, the electrical connection between the motherboard video socket 20 and the video monitor is effected by passing the video signal cable 24 directly into the chassis and under the motherboard. To this end, the connection between the video socket 20 and the input end of the video signal cable 24 is looped through an angle of 180°. As a result, as shown in FIG. 1, the cable 24, rather than extending at least in part outwardly and rearwardly from the chassis, extends along its entire length inwardly into the chassis and under the motherboard 22 for connection to the internal monitor, thereby to complete the video signal path from the motherboard video socket to the monitor. The external molded, decorative cover or plug 12 is secured to the vertical wall 34 of the chassis such as by screws 36 (FIG. 5) so as to present a neat and decorative appearance at the external part of the chassis.

Figure 4:
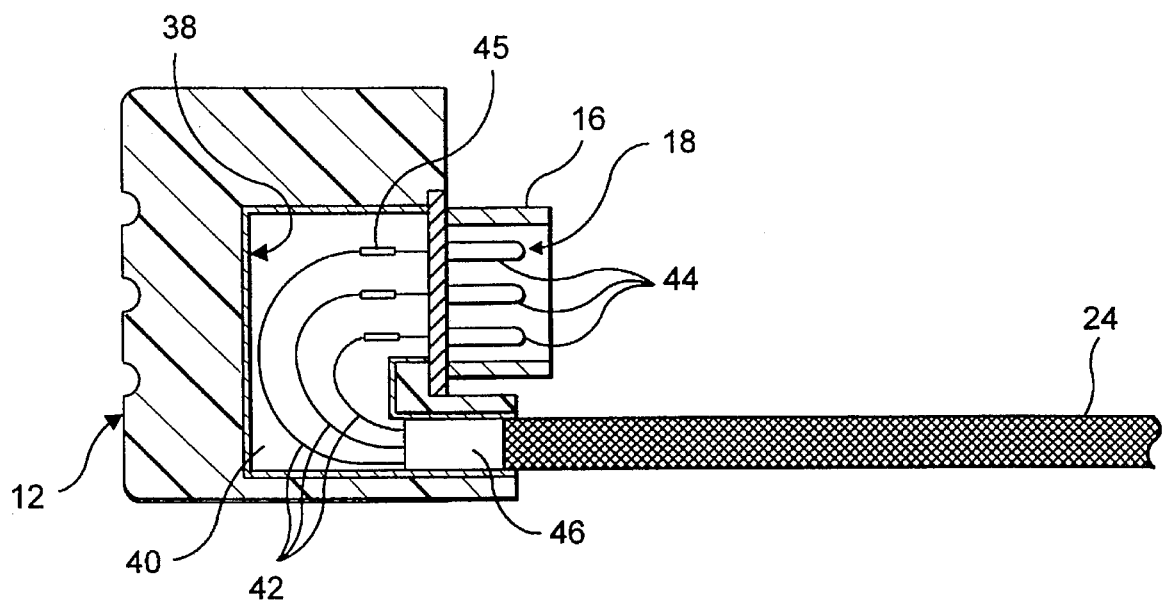
FIG. 4 is a cross-sectional view of the connector end plug of FIGS. 1 and 2 taken along the section lines 4—4 in FIG. 3.

As seen best in FIG. 4, a metal or foil shield 38 is affixed to the inner surface of cover 12 in order to provide EMI shielding. A plurality (here 15) of wires 42 located in an internal cavity 40 are respectively connected at one of their ends to a corresponding plurality of pins 44 at 45 by any suitable means such as soldering or crimping. The other ends of wires 42 pass through an opening in projection 26 and are connected to corresponding connections (not shown) as at 46 at the inner end of cable 24 at or near projection 26, thereby to connect plug 18 to the input end of cable 24.

In accordance with one aspect of the invention, internal wires 42 are passed through an angle of 180° between their connection to pins 44 and their connections to the inner end of cable 24. In this manner, the cable 24 can be extended beneath the motherboard 22 and inwardly of the connector 10. As shown in FIG. 1, the cable can be directed into the microprocessor unit without any portion of it being external to the PC chassis. The molded, decorative plastic cover 12, all that is visible at the outside of the PC chassis or housing, covers the socket and presents a decorative, uncluttered external appearance, as desired.

Whereas the present invention has been described hereinabove with respect to a presently preferred embodiment it will be apparent to those having ordinary skill in the art that variations and modifications may be made thereto without necessarily departing from the spirit and scope of the invention.

What is claimed is:

1. A connector for use in connecting the output of a video socket mounted on a PC motherboard to a remote video monitor mounted on a common chassis with the motherboard, said connector comprising an end cover, an internal cavity, a video plug including a plurality of pins, said plug being adapted to be connected to the video socket, a plurality of conductors in said cavity having one of their ends respectively connected to said plurality of pins, a video cable having one end connected to the other ends of said plurality of conductors and another end adapted to be connected to the input of the video monitor, said conductors being looped around an angle of approximately 180° between the connections to said pins and the connection to said cable, whereby said cable can extend inwardly from the connector and under the motherboard to the video monitor input.

2. The connector of claim 1, wherein said end cover is a molded, decorative piece of plastic.

3. The connector of claim 1, further comprising a plate mounted to the inner end of said cover, said plug being secured to said plate, said cavity being formed between said plate and said end cover.

4. The connector of claim 3, further comprising a foil shield affixed to the inner surface of said end cover and around said inner cavity.

* * * * *